US012706389B2

(12) United States Patent
Ho et al.

(10) Patent No.: US 12,706,389 B2
(45) Date of Patent: Aug. 11, 2026

(54) APPLICATION OF A METASURFACE LENS

(71) Applicant: Amphenol Antenna Solutions, Inc., Conover, NC (US)

(72) Inventors: Jimmy Ho, Hickory, NC (US); Erik Thijssen, Tours (FR); Tony Pallone, Civray de Touraine (FR); Thomas Hardy, Montlouis-sur-Loire (FR); Cyrille Leblanc, Poce-sur-Cisse (FR); Eric Proteau, Mosnes (FR)

(73) Assignee: Amphenol Antenna Solutions, Inc., Conover, NC (US)

( * ) Notice: Subject to any disclaimer, the term of this patent is extended or adjusted under 35 U.S.C. 154(b) by 388 days.

(21) Appl. No.: 18/298,795

(22) Filed: Apr. 11, 2023

(65) Prior Publication Data

US 2024/0347922 A1 Oct. 17, 2024

(51) Int. Cl.
*H01Q 15/02* (2006.01)
*H01Q 19/06* (2006.01)

(52) U.S. Cl.
CPC ........... *H01Q 15/02* (2013.01); *H01Q 19/062* (2013.01); *H01Q 19/065* (2013.01)

(58) Field of Classification Search
CPC ..... H01Q 15/02; H01Q 19/062; H01Q 19/065
See application file for complete search history.

(56) References Cited

U.S. PATENT DOCUMENTS 7,898,480 B2 * 3/2011 Ebling ..................... H01Q 3/30
343/810
8,811,511 B2 * 8/2014 Sayeed .................. H01Q 15/02
343/912
10,116,058 B2 * 10/2018 Oh ....................... H01Q 19/062
(Continued)

FOREIGN PATENT DOCUMENTS

| | | | |
|---|---|---|---|
| CN | 109698407 | A | 4/2019 |
| CN | 115173069 | A | 10/2022 |
| WO | WO 2022/138397 | A1 | 6/2022 |

OTHER PUBLICATIONS

International Search Report and Written Opinion mailed Aug. 28, 2024 in connection with International Application No. PCT/IB2024/000216.

(Continued)

*Primary Examiner* — Amal Patel
(74) *Attorney, Agent, or Firm* — Myers Bigel, P.A.

(57) ABSTRACT

An antenna includes a radiating structure to radiate electromagnetic waves having a phase along a radiating path extending in an axial direction, and a lens disposed in the radiating path and configured to pass the electromagnetic waves therethrough. The lens includes at least one lamina having a first surface, a second surface, a center axis that is aligned with the axial direction, a lamina thickness between the first surface and the second surface in a direction parallel to the axial direction, and an axial region extending about the center axis. Conductive scattering elements are arranged on the first surface, the second surface or both the first surface and the second surface. The conductive scattering elements are configured to change a first phase of the electromagnetic waves passing through the plurality of conductive scattering elements with respect to a second phase of the electromagnetic waves passing through the axial region.

16 Claims, 15 Drawing Sheets

(56) References Cited

U.S. PATENT DOCUMENTS

| | | | | |
|---|---|---|---|---|
| 10,931,029 | B2 * | 2/2021 | Ko | H04B 7/0617 |
| 2022/0368024 | A1 * | 11/2022 | Cao | H01Q 15/08 |

OTHER PUBLICATIONS

Ramaccia et al., Broadband compact horn antennas by using EPS-ENZ metamaterial lens. IEEE Transactions on Antennas and Propagation. Apr. 3, 2013;61(6):2929-37.

Zhang, 3D printed dielectric Fresnel lens. 2016 10th European Conference on Antennas and Propagation (EUCAP), European Association of Antennas and Propagation. Apr. 2016, 3 pages.

* cited by examiner

10
Axial direction 10
94
Axial direction
Y
X
Z
Azimuth plane xz
Elevation plane yz
10
108
106
30
102
Axial direction
100
31
110
104

FIGURE 7A
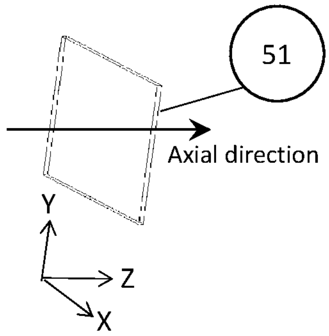
FIGURE 7B
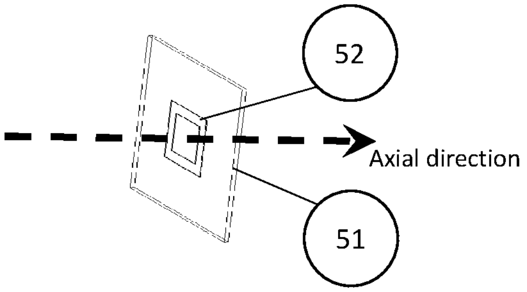
FIGURE 7C
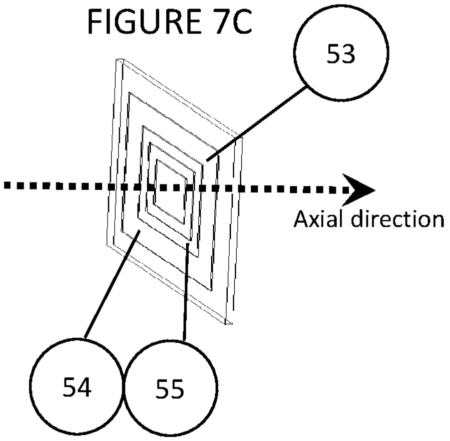
FIGURE 7D
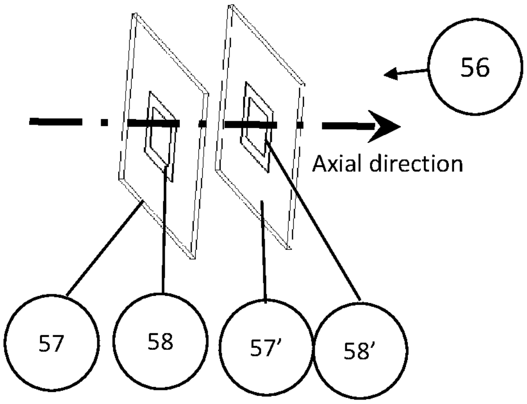
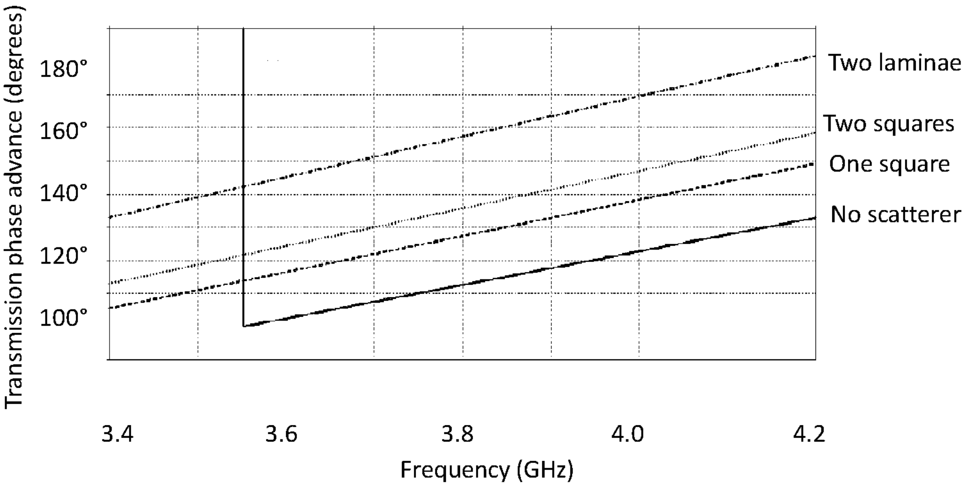
FIGURE 7E

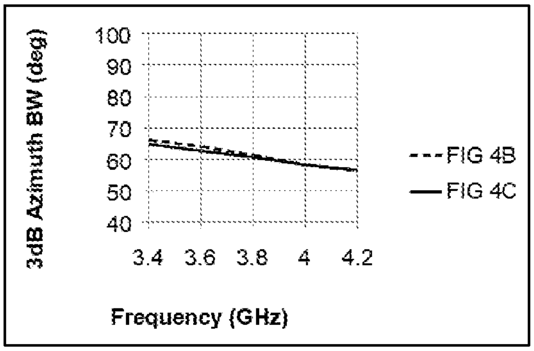
FIGURE 8A
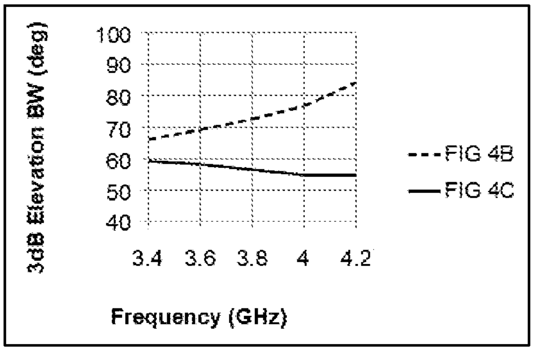
FIGURE 8B
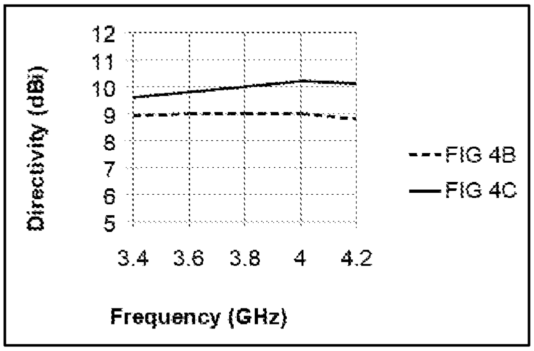
FIGURE 8C
| Frequency GHz | Gain (FIG 4C) - Gain (FIG 4B) |
|---|---|
| 3.4 | 0.7 |
| 3.6 | 0.8 |
| 3.8 | 1 |
| 4 | 1.2 |
| 4.2 | 1.3 |
FIGURE 8D

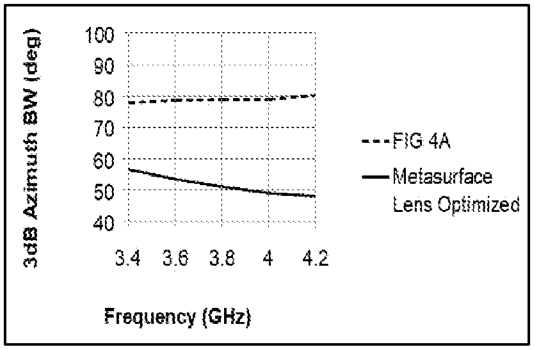
FIGURE 9A
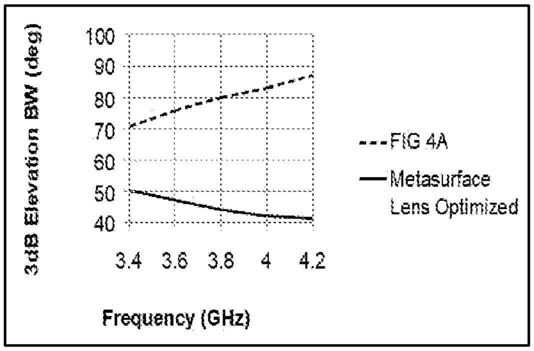
FIGURE 9B
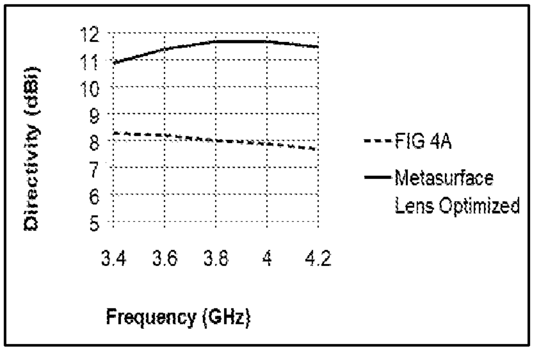
FIGURE 9C
| Frequency GHz | Gain (Metasurface Lens Optimized) - Gain (FIG4A) |
|---|---|
| 3.4 | 2.6 |
| 3.6 | 3.2 |
| 3.8 | 3.7 |
| 4 | 3.8 |
| 4.2 | 3.8 |
FIGURE 9D

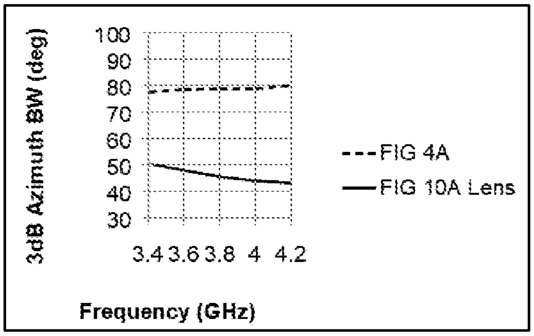
FIGURE 11A
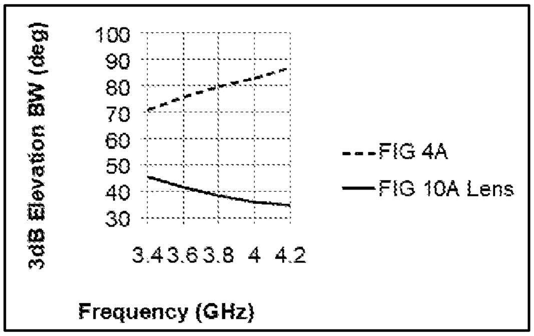
FIGURE 11B
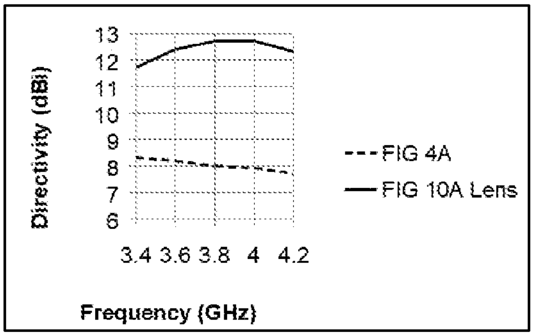
FIGURE 11C
| Frequency GHz | Gain (FIG10A Lens) - Gain (FIGA) |
|---|---|
| 3.4 | 3.4 |
| 3.6 | 4.2 |
| 3.8 | 4.7 |
| 4 | 4.8 |
| 4.2 | 4.6 |
FIGURE 11D

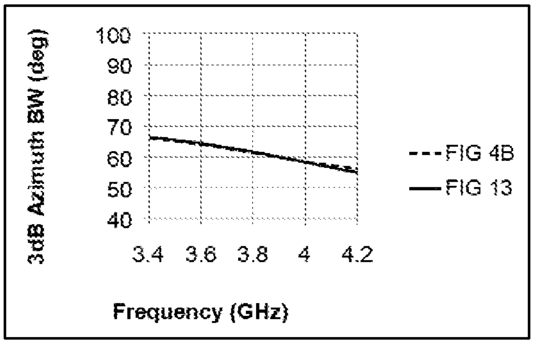
FIGURE 14A
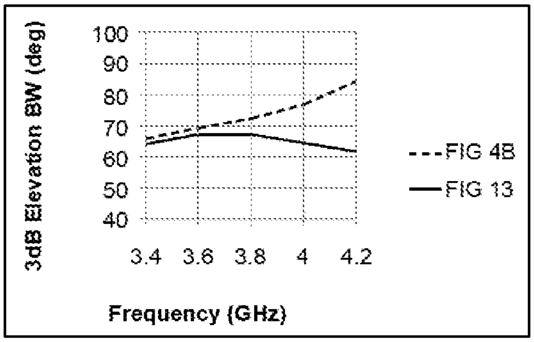
FIGURE 14B
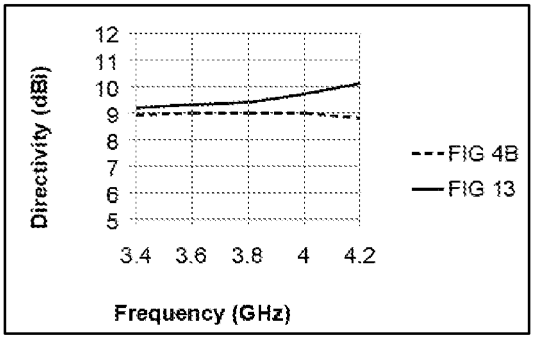
FIGURE 14C
FIGURE 14D
| Frequency GHz | Gain (FIG 13) - Gain (FIG 4B) |
|---|---|
| 3.4 | 0.3 |
| 3.6 | 0.3 |
| 3.8 | 0.4 |
| 4 | 0.7 |
| 4.2 | 1.3 |

APPLICATION OF A METASURFACE LENS

FIELD OF THE DISCLOSURE

The disclosure relates to antennas, and in particular, to the configuration and application of a metasurface lens to modify the performance of an antenna.

BACKGROUND

The advent of cellular radio systems has seen a great demand for base station antennas able to operate over wide frequency bandwidths while maintaining parameters such as gain, beamwidth and voltage standing wave ratio (VSWR) within limits that are acceptable for their intended function. National and international radiocommunications administrations have continued to assign additional frequency bands for use by cellular mobile radio networks. As a consequence, mobile radio network operators desire base station antennas providing for operation over increased bandwidths.

SUMMARY

According to a non-limiting embodiment, an antenna includes a radiating structure to radiate electromagnetic waves having a phase along a radiating path extending in an axial direction, and a lens disposed in the radiating path and configured to pass the electromagnetic waves therethrough. The lens includes at least one lamina having a first surface, a second surface, a center axis that is aligned with the axial direction, a lamina thickness between the first surface and the second surface in a direction parallel to the axial direction, and an axial region extending about the center axis. Conductive scattering elements are arranged on the first surface, the second surface or both the first surface and the second surface. The conductive scattering elements are configured to change a first phase of the electromagnetic waves passing through the plurality of conductive scattering elements with respect to a second phase of the electromagnetic waves passing through the axial region.

In additional embodiments, or as an alternative, an amount of back-scattered energy reflected by the axial region is less than an amount of back-scattered energy reflected by the non-axial region.

In additional embodiments, or as an alternative, the axial region of the lens includes an area devoid of the conductive scattering elements.

In additional embodiments, or as an alternative, the conductive scattering elements include at least one of planar conductive scattering elements shaped as unfilled polygons, planar conductive scattering elements shaped as filed polygons, planar conductive scattering elements shaped as circular closed lines, and planar conductive scattering elements shaped as filled circles.

In additional embodiments, or as an alternative, the conductive scattering elements have a profile of one or a combination of concentric circles, ellipses, and polygons.

In additional embodiments, or as an alternative, the conductive scattering elements are arranged in rows extending in a radial direction with respect to the axial direction.

In additional embodiments, or as an alternative, the conductive scattering elements are disposed in a rectilinear arrangement that forms a plurality of row and a plurality of columns.

In additional embodiments, or as an alternative, the at least one lamina includes at least one of a planar lamina or a curved lamina.

In additional embodiments, or as an alternative, at least one lamina includes a plurality of laminas arranged in series next to one another along the axial direction. Each of the laminas includes a first lamina including a first plurality of conductive scattering elements having a first arrangement, a first shape, and a first size, and a second lamina including a first plurality of conductive scattering elements having a second arrangement, a second shape, and a second size. The at least one of the second arrangement, the second shape, and the second size is different from the first arrangement, the first shape, and the first size, respectively.

In additional embodiments, or as an alternative, the at least one radiating structure operates at a frequency greater than or equal to 0.5 gigahertz (Ghz) and less than or equal to 100 GHz.

According to another non-limiting embodiment, a metasurface lens comprises at least one lamina configured to pass electromagnetic waves traveling along a radiating path that extends along an axial direction of at least one radiating structure. The at least one lamina includes a first surface extending to an opposing second surface in a direction parallel to the axial direction to define a lamina thickness, an axial region extending radially from a center axis of the at least one lamina and configured to align with the radiating structure along the axial direction, and a plurality of conductive scattering elements arranged on one or both of the first surface and the second surface. The plurality of conductive scattering elements are configured to change the phase of the electromagnetic waves passing therethrough with respect to the phase of the electromagnetic waves passing through the axial region.

According to yet another non-limiting embodiment, a method of transmitting electromagnetic waves from an antenna is provided. The method comprises radiating, from at least one radiating structure, electromagnetic waves having a first phase, directing the electromagnetic waves along a radiating path extending in an axial direction, and passing the electromagnetic waves through an axial region of a lens including at least one lamina and a plurality of conductive scattering elements. The plurality of conductive scattering elements change the first phase of the electromagnetic waves to a second phase, wherein the first phase is different from the second phase.

In additional embodiments, or as an alternative, the method further includes delivering the electromagnetic waves having a wavefront curvature to an outer portion of the at least one lamina located adjacent an outer perimeter of the at least one lamina and to an inner portion of the lamina located between the outer portion and the axis region, and reducing the wavefront curvature in response to passing the electromagnetic waves through the outer portion and the inner portion.

In additional embodiments, or as an alternative, reducing the wavefront curvature includes delivering a first portion of the electromagnetic waves to the inner portion which includes at least one inner conductive scattering element among the plurality of conductive scattering elements; delivering a second portion of the electromagnetic waves to the outer portion which includes at least one outer conductive scattering element among the plurality of conductive scattering elements disposed; effecting a first phase advance on the first portion of the electromagnetic waves passing through the at least one inner conductive scattering element; and effecting a second phase advance greater than the first phase advance on the second portion of the electromagnetic waves passing through the at least one outer conductive scattering element.

According to another non-limiting embodiment, a method of manufacturing an antenna is provided. The method comprises providing at least one radiating structure configured to radiate electromagnetic waves having a first phase along a radiating path extending in an axial direction, and providing a lens disposed in the radiating path and configured to pass the electromagnetic waves therethrough. The lens includes at least one lamina having a first surface, a second surface, a center axis that is aligned with the axial direction, a lamina thickness between the first surface and the second surface in a direction parallel to the axial direction, and an axial region extending about the center axis; and a plurality of conductive scattering elements arranged on the first surface, the second surface or both the first surface and the second surface. The conductive scattering elements are configured to change the first phase of the electromagnetic waves passing through the plurality of conductive scattering elements to a second phase.

According to still another non-limiting embodiment, a method of transmitting electromagnetic waves from an antenna is provided. The method comprises at least one of providing and identifying at least one radiating structure; radiating, from the at least one radiating structure, electromagnetic waves having a phase; and directing the electromagnetic waves along a radiating path extending in an axial direction. The method further comprises disposing a lens in the radiating path. The lens includes at least one lamina having an axial region aligned with respect to the axial direction and having a plurality of conductive scattering elements. The method further comprises passing the electromagnetic waves through the axial region and the plurality of conductive scattering elements. The plurality of conductive scattering elements change the phase of the electromagnetic waves with respect to the phase of the electromagnetic waves passing through the axial region.

BRIEF DESCRIPTION OF THE DRAWINGS

FIGS. 7A, 7B, 7C and 7D show non-limiting examples of forms of conductive scattering elements configured as closed squares and concentric arrangements of closed squares.

FIG. 7E shows the frequency dependence of the phase shift of a wave propagating through conductive scattering elements configured by way of example as closed squares and concentric arrangements of closed squares.

FIGS. 8A, 8B and 8C show the results of simulated azimuth beamwidth, elevation beamwidth and gain of a crossed dipole source antenna as shown in FIG. 4B, and comparative simulations when a metasurface lens according to one or more non-limiting embodiments of the present disclosure is placed in front of the crossed dipole antenna as shown in FIG. 4C and configured to provide a substantial reduction in elevation beamwidth.

FIG. 8D is a table showing the corresponding difference in gain.

FIGS. 9A, 9B and 9C show the results of simulated azimuth beam width, elevation beamwidth and gain of a crossed dipole source antenna as shown in FIG. 4A, and comparative simulations when a metasurface lens according to one or more non-limiting embodiments of the present disclosure is placed in front of the crossed dipole antenna as shown in FIG. 4A and configured to provide a substantial increase in gain.

FIG. 9D is a table showing the corresponding increase in gain achieved by the use of a metasurface lens according to one or more non-limiting embodiments of the present disclosure.

FIGS. 11A, 11B and 11C show the results of simulated azimuth beam width, elevation beamwidth and gain of a crossed dipole source antenna as shown in FIG. 4A. They also show comparative simulations when a metasurface lens including conductive scattering elements arranged on two planar dielectric lamina according to one or more non-limiting embodiments of the present disclosure is placed in front of the crossed dipole antenna shown in FIG. 4A and configured to provide a substantial increase in gain.

FIG. 11D is a table showing the corresponding increase in gain.

FIGS. 14A, 14B and 14C show the results of simulated azimuth beamwidth, elevation beamwidth and gain of a crossed dipole source antenna as shown in FIG. 4B. They also show comparative simulations when an asymmetric metasurface lens according to one or more non-limiting embodiments of the present disclosure is placed in front of the crossed dipole antenna as shown in FIG. 4B and configured to azimuth and elevation beamwidths having reduced variation with frequency.

FIG. 14D is a table showing the corresponding difference in gain.

DETAILED DESCRIPTION

Figure 1A:
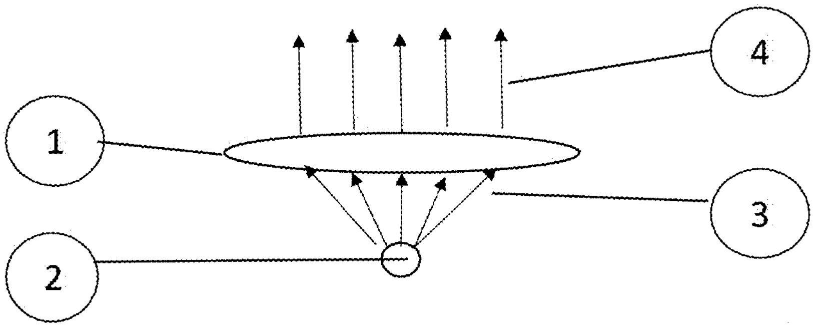
FIGURE 1A PRIOR ART
FIG. 1A shows a conventional bi-convex lens and the paths of axial and off-axis rays passing through it.

Most modern mobile radio networks are planned using base station antennas having a directional azimuth radiation pattern with a nominal half-power azimuth beamwidth. Such beamwidth may be between 60 degrees and 65 degrees. A single base station antenna may include a vertical column of dual-polar radiating elements, transmitting and receiving signals with linear polarizations inclined ±45 degrees to the vertical. Antenna arrays may include a plurality of radiating structures such as crossed dipoles and patches, mounted in front of a reflector. According to a non-limiting embodiment, the configuration of radiating structures and the reflector geometry are chosen by design to provide the required azimuth beamwidth, optimized as far as possible such that the nominal beamwidth is maintained over the widest possible range of frequencies (often referred to as "bandwidth" of the antenna).

A modern base station antenna may include a plurality of independent dual-polar antenna arrays arranged in a single physical housing. These may operate in the same frequency band, or in different frequency bands that are assigned to cellular radio networks.

In an exemplary embodiment, design parameters that together provide the required azimuth beamwidth of an antenna array include the choice of the antenna elements, their spacing from a conductive reflector placed behind them, and the cross-sectional geometry of the reflector. For example, the reflector may be a flat plate of chosen width, or may be bent, curved, flanged or slotted. Conductive enclosures that surround each radiating element may be provided, along with parasitic elements that operate cooperatively with the radiating elements and reflector.

In an exemplary embodiment, one or more lenses may be placed in front of an antenna or radiating structure. Such lenses can be convex lenses, or equivalent, whose function is to focus the energy radiated from the element, reducing the beamwidth provided by the element itself, and increasing its gain. In an exemplary embodiment, lenses are made from dielectric materials, for example polyethylene, but they have the characteristic that while most of the energy impinging on the lens may be transmitted in a forward beam, some energy is reflected by the surfaces of the lens and the reflected power is then received by the radiating element. The effect of this reflected power is to change the impedance presented by the radiating element to its feed line. According to the feed arrangements for an array of elements, this may disrupt the elevation radiation pattern of a base station antenna, and is very likely to increase the voltage standing wave ratio (VSWR) presented by the array to its feed line. In both cases such effects may be undesirable and generally become more troublesome for an antenna requiring a wide operating bandwidth. This is because the distance between the element and the lens causes the phase of the reflected signal to change with frequency, making it difficult to compensate the undesirable effects of the reflected signal on the input impedance of the element over a wide bandwidth.

In another exemplary embodiment, antenna technology may include the use of (3-dimensional) metamaterials and (2-dimensional) metasurfaces. These include arrangements of conductive scattering elements (sometimes referred to as "lattice elements), each element being much smaller than the wavelength at the operating frequency. The conductive scattering elements may be disposed in 3-D space or in a 2-D plane and may be supported by a dielectric medium. For example, a 3-D arrangement, may be supported by a foam material with low loss and low relative permittivity, or a 2-D arrangement may be etched on a planar low-loss dielectric material such as is used for printed circuit laminas. Conductive scattering elements such as but not limited to resonant structures (for example split-ring resonators) and non-resonant structures (such as small rings, crosses, disks and squares) may be employed. Regular arrays of conductive scattering elements having constant shape, dimensions and spacing, or to allow one or more of these parameters to change (for example as a function of radius from the axis of the incident radiation) may also be employed.

Figure 1B:
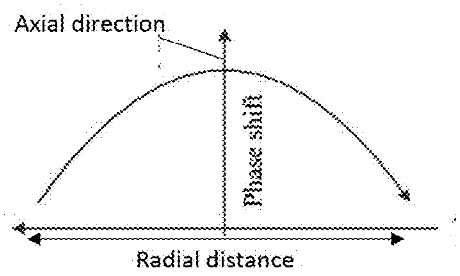
FIGURE 1B PRIOR ART
FIG. 1B shows the relationship between phase delay and axial distance for the lens of FIG. 1A.

In FIG. 1A a biconvex lens 1 is shown in cross section. A source antenna 2 is positioned on one side of the lens from which rays 3 diverge. On passing through the lens the emergent rays 4 are parallel on account of the action of the lens. As shown in the graph in FIG. 1B the lens imposes a larger phase shift on axial rays relative to those distant from the center axis.

Figure 1C:
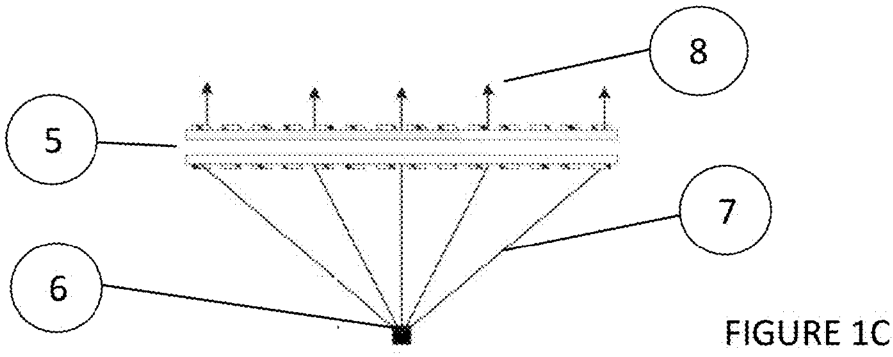
FIGURE 1C PRIOR ART
FIG. 1C shows a metamaterial lens, having an axial region providing the largest phase shift across the aperture of the lens, and the paths of axial and off-axis rays passing through it.
Figure 1D:
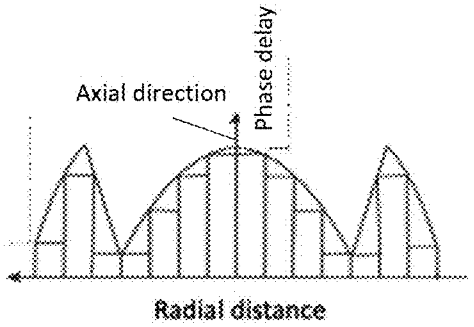
FIGURE 1D PRIOR ART
FIG. 1D shows the relationship between phase delay and axial distance for the lens of FIG. 1C.

In FIG. 1C a similar directional source 6 illuminates a substantially planar metamaterial or metasurface lens 5 and divergent rays 7 emerge parallel to one another 8. As in the previous case the lens imposes maximum phase shift in its axial region (i.e., the region of the lens 5 that is aligned with the "axial direction" of at which the source 6 radiates the electromagnetic waves), diminishing with distance therefrom. In this example the lens is 'zoned' in a conventional manner; because a phase shift of (f)° and (f-360°) have similar effect, the total phase shift required from the lens can be reduced in steps, simplifying its design. For a circular lens, these steps are cylindrically symmetrical, appearing a circles on the face the lens, a configuration known as a Fresnel lens.

In an exemplary embodiment, the thickest portion of the conventional lens 1 and that portion of the metamaterial lens 5 which provides the largest phase shift are close to the axis of each lens. In the case of the conventional biconvex lens the phase shift is a phase delay, caused by the reduced velocity of propagation of the electromagnetic wave through a dielectric medium. The metasurface lens is similarly designed to create a phase delay, the delay diminishing as a function of radial distance from the axis of the lens.

In an exemplary embodiment, the azimuth beamwidth required from a cellular radio base station antenna is around 65 degrees. In response to the need for an aesthetically acceptable, low cost package, a base station antenna may have limited frontal dimensions. As a consequence the dimensions of a metasurface lens to adjust or correct the azimuth beamwidth may be correspondingly small in terms of the operating wavelength. Such a lens may accordingly be positioned relatively close to the radiating elements. Introduction of a metasurface lens close to the radiating elements of a base station antenna element may cause unwanted reflections, which may in turn increase the VSWR of the radiating elements at some frequencies in the operating frequency range to an undesirable extent. One or more non-limiting embodiments of the present disclosure provides a metasurface lens having a desirable focusing effect while overcoming this disadvantage.

According to one or more non-limiting embodiments of the present disclosure, there is provided a metasurface lens having an axial aperture and/or an axial region configured with sparse or absent conductive scattering elements (also referred to as “lattice elements”). According to a non-limiting embodiment, the lens is situated in front of a substantially unidirectional antenna to provide the effect of focusing electromagnetic energy radiated by the antenna while creating a low level of back-scattered radiation, thereby minimizing reduction of the impedance bandwidth of the antenna.

Figure 2A:
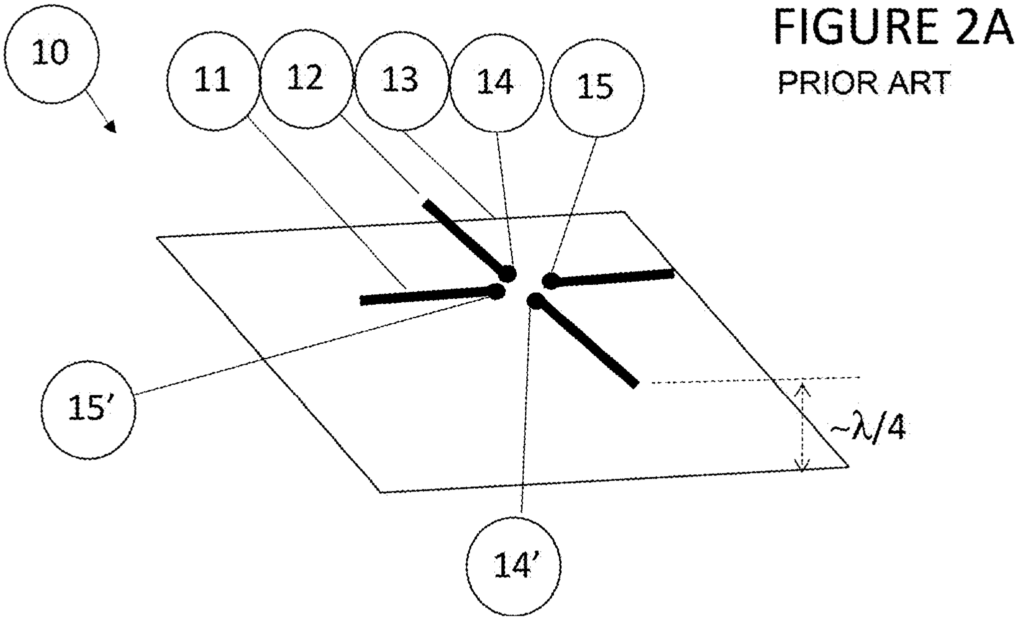
FIGURE 2A PRIOR ART
FIG. 2A shows a crossed dipole radiating element in front of a planar conductive reflector.
Figure 2B:
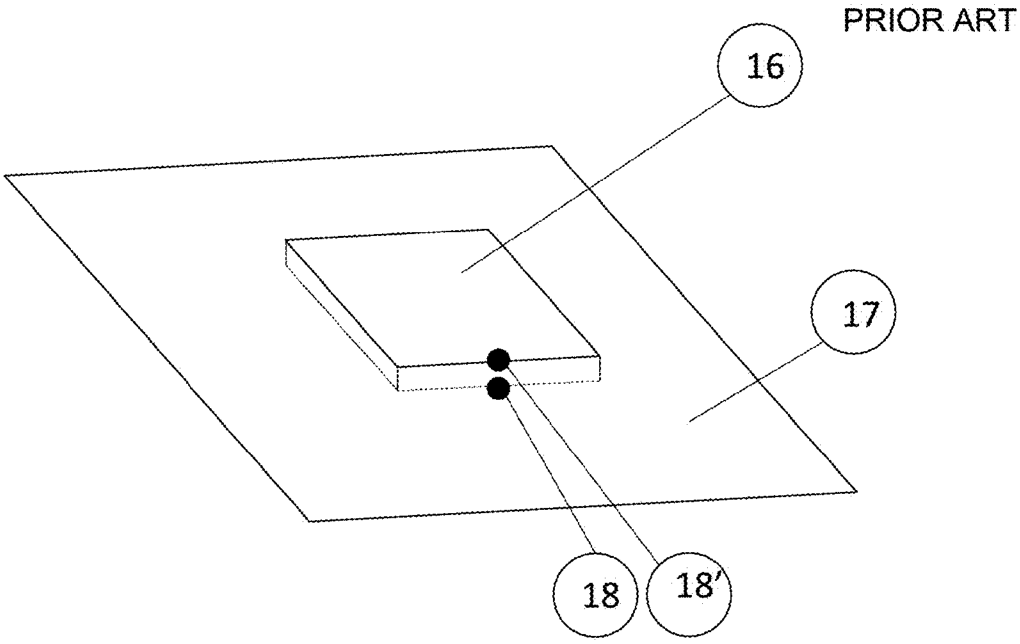
FIGURE 2B PRIOR ART
FIG. 2B shows a patch radiating element.

With reference to FIGS. 2A and 2B the unidirectional antenna 10 may for example include a dipole or crossed dipole radiating element 11, 12 typically spaced by approximately a quarter-wavelength at the operating frequency from a conductive planar reflector 13 and excited by providing a signal between pairs of terminals 14, 14' and 15, 15'. In other embodiments the unidirectional antenna may by way of example include a patch 16 on a ground plane 17 driven by a voltage applied across terminals 18, 18'. Further examples are a slot antenna, a horn antenna, or a substantially unidirectional antenna of any other form.

Figure 3A:
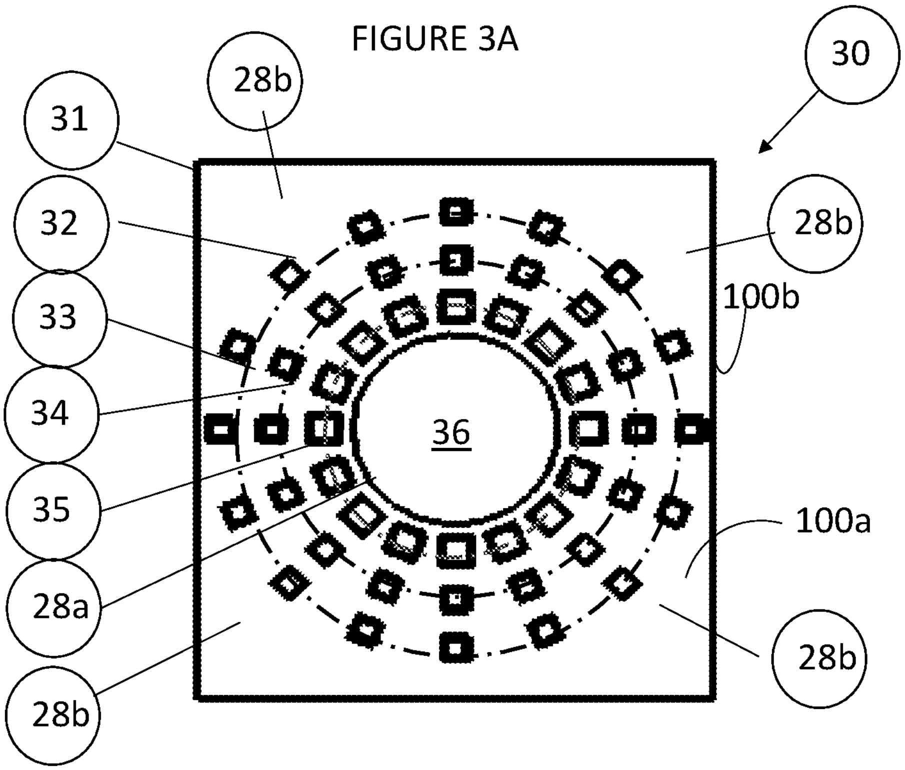
FIG. 3A shows an example of a metasurface lens in accordance with the one or more non-limiting embodiments of the present disclosure, which includes a plurality of substantially square conductive scattering elements arranged in concentric circles.

FIG. 3A shows an example of a metasurface lens 30 according to one or more non-limiting embodiments of the present disclosure. The metasurface lens 30 includes a lamina 31 that includes a first surface, a second surface opposite the first surface, an axial region 28*a*, and a non-axial region 28*b* surrounding the axial region 28*a*. As described herein, the axial region 28*a* includes the region of the lens 5 that is aligned with the “axial direction” of at which the radiating element (e.g., source antenna) radiates electromagnetic waves. In one or more non-limiting embodiments the axial region 28*a* receives a first portion of the electromagnetic waves and/or a first group of electromagnetic waves (e.g., “axial rays), and the non-axial region 28*b* receives a second portion of the electromagnetic waves and/or a second group of electromagnetic waves (e.g., “off-axial rays).

The lamina 31 can be formed from various dielectric materials including, but not limited to, fiberglass, glass epoxy laminate, or any suitable dielectric lamina material. The metasurface lens 30 further includes a plurality of conductive scattering elements 32 (also referred to as “scattering elements” or “lattice elements”) formed on a surface of the lamina 31. The conductive scattering elements 32 can be formed of various metal materials including, for example, copper. According to a non-limiting embodiment, the conductive scattering elements 32 have a substantially square profile and are arranged in concentric circles 33, 34, 35 surrounding the axial region 28*a*. It should be appreciated that the profile of the conductive scattering elements 32 can have other shapes without departing from the scope of the disclosure.

According to a non-limiting embodiment, the axial region 28*a* defines a central aperture 36, which may be a physical aperture in the lamina 31 or may be regions of the lamina 31 wherein no conductive scattering elements 32 are present. That is, in some embodiments the aperture is excludes elements (e.g., scattering elements), while in other embodiments the aperture 36 can include elements (e.g., scattering elements). In one or more non-limiting embodiments, a void is formed in the axial region 28*a* to define the central aperture 36.

Figure 3B:
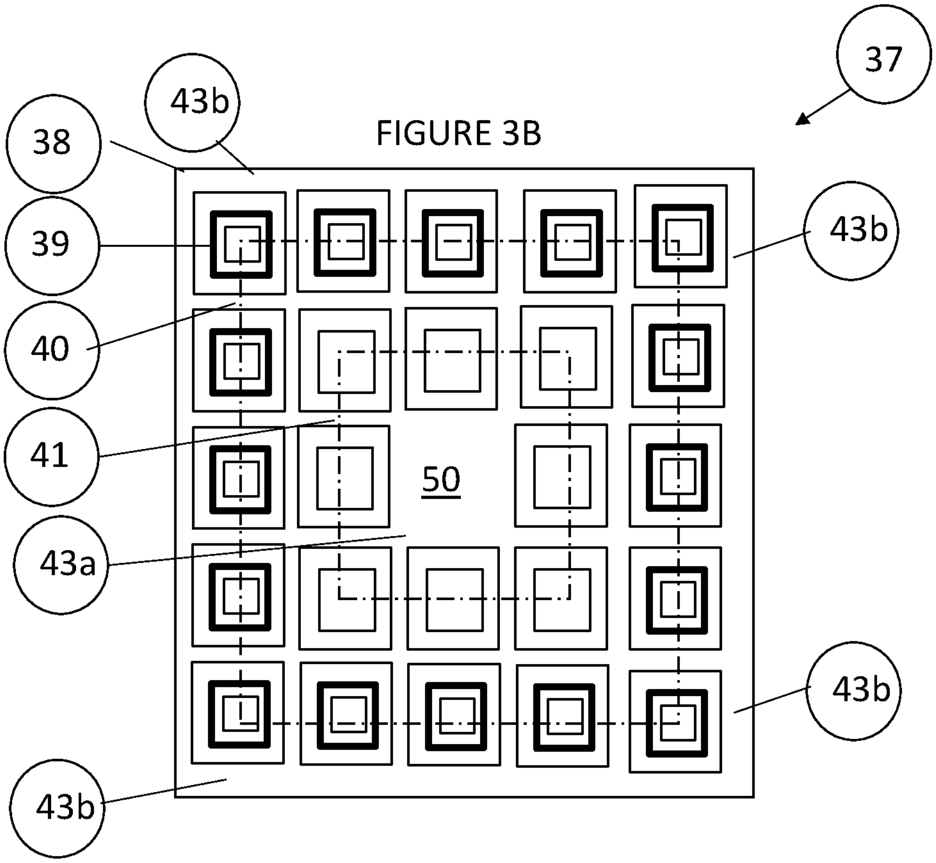
FIG. 3B shows another example of a metasurface lens in accordance with one or more non-limiting embodiments of the present disclosure, which includes a plurality of substantially square conductive scattering elements arranged in concentric squares.

FIG. 3B shows a further example of a metasurface lens 37 according to one or more non-limiting embodiments of the present disclosure. The metasurface lens 37 includes a lamina 38 that includes a first surface, a second surface opposite the first surface, an axial region 43*a*, and a non-axial region 43*b* surrounding the axial region 43*a*. In one or more non-limiting embodiments the axial region 43*a* receives a first portion of the electromagnetic waves and/or a first group of electromagnetic waves (e.g., “axial rays), and the non-axial region 43*ba* receives a second portion of the electromagnetic waves and/or a second group of electromagnetic waves (e.g., “off-axial rays).

The lamina 38 can be formed from various dielectric materials including, but not limited to, fiberglass, glass epoxy laminate, or any suitable dielectric lamina material. The metasurface lens 30 further includes a plurality of conductive scattering elements 39 formed on a surface of the lamina 38. According to a non-limiting embodiment, the conductive scattering elements 39 have a substantially square profile and are arranged in concentric squares 40, 41 surrounding the axial region 43*a*. The central aperture 43 may be a physical aperture in the dielectric lamina or may be regions of the lamina wherein no conductive scattering elements are present. In one or more non-limiting embodiments, a void is formed in the axial region 43*a* to define a central aperture 50, which may be a physical aperture in the lamina 38 or may be regions of the lamina 38 wherein no conductive scattering elements 39 are present. In one or more non-limiting embodiments, a void is formed in the axial region 43*a* to define the central aperture 50.

While both examples described above are symmetrical, asymmetric arrangements are also possible and may be advantageous when the source antenna is asymmetric. For example, an antenna may include a plurality of radiating elements disposed in an asymmetric arrangement. In this case, the lens can include an asymmetric arrangement of conductive scattering elements arranged with respect to the asymmetric arrangement of radiating elements.

The arrangement of the conductive scattering elements in concentric circles and squares is by way of example and is not limiting. According to a non-limiting embodiment, the number of conductive scattering elements in each radial direction is chosen by design. For example, a lens having axial symmetry may be advantageous, in which case the conductive scattering elements may be arranged in concentric groups having any regular polygonal form. In another example embodiment, a lens may be required to focus energy in a single plane, in which case an asymmetric or substantially linear geometry may be more appropriate. In one or more non-limiting embodiments, the angles between adjacent radial rows of conductive scattering elements 32 shown in FIG. 3A can be chosen by design and/or the application of the antenna. Likewise, the distances between adjacent rows and between adjacent columns of conductive scattering elements 39 shown in FIG. 4B can be chosen by design and/or the application of the antenna.

According to one or more non-limiting elements, the conductive scattering elements 32, 39 have dimensions substantially smaller than the operating wavelength and may take many forms, for example squares, circles and crosses, these being realized either as filled shapes or outlines. The dimensions of the conductive scattering elements are chosen by design such that the phase shift caused to an electromagnetic wave passing through the lens varies as a function of the distance from the center axis of the lens. The rate of change of the phase shift with radial distance from the axial direction of the radiating path of the lens determines the effective focal length of the lens and is chosen by design to suit particular applications. In one implementation the scatterers were initially dimensioned as 0.05 wavelengths in diameter, arranged on two circles having diameters of 0.49 and 0.55 wavelengths. In the same implementation the central aperture is 0.43 wavelengths in diameter which is the size of the physical aperture of the radiating structure which typically range, for example, from about 0.4 to about 0.6 wavelengths.

According to one or more non-limiting embodiments of the present disclosure, the design of a lens can be accomplished by the use of an electronic computer program providing simulation of electromagnetic waves in the presence of conductive scattering elements, for example CST Studio Suite or REMCOM XFdtd, which provide facilities for the optimization of the shape and dimensions of individual scattering elements and their configuration on a dielectric lamina.

Figures 4A, 4B, 4C:
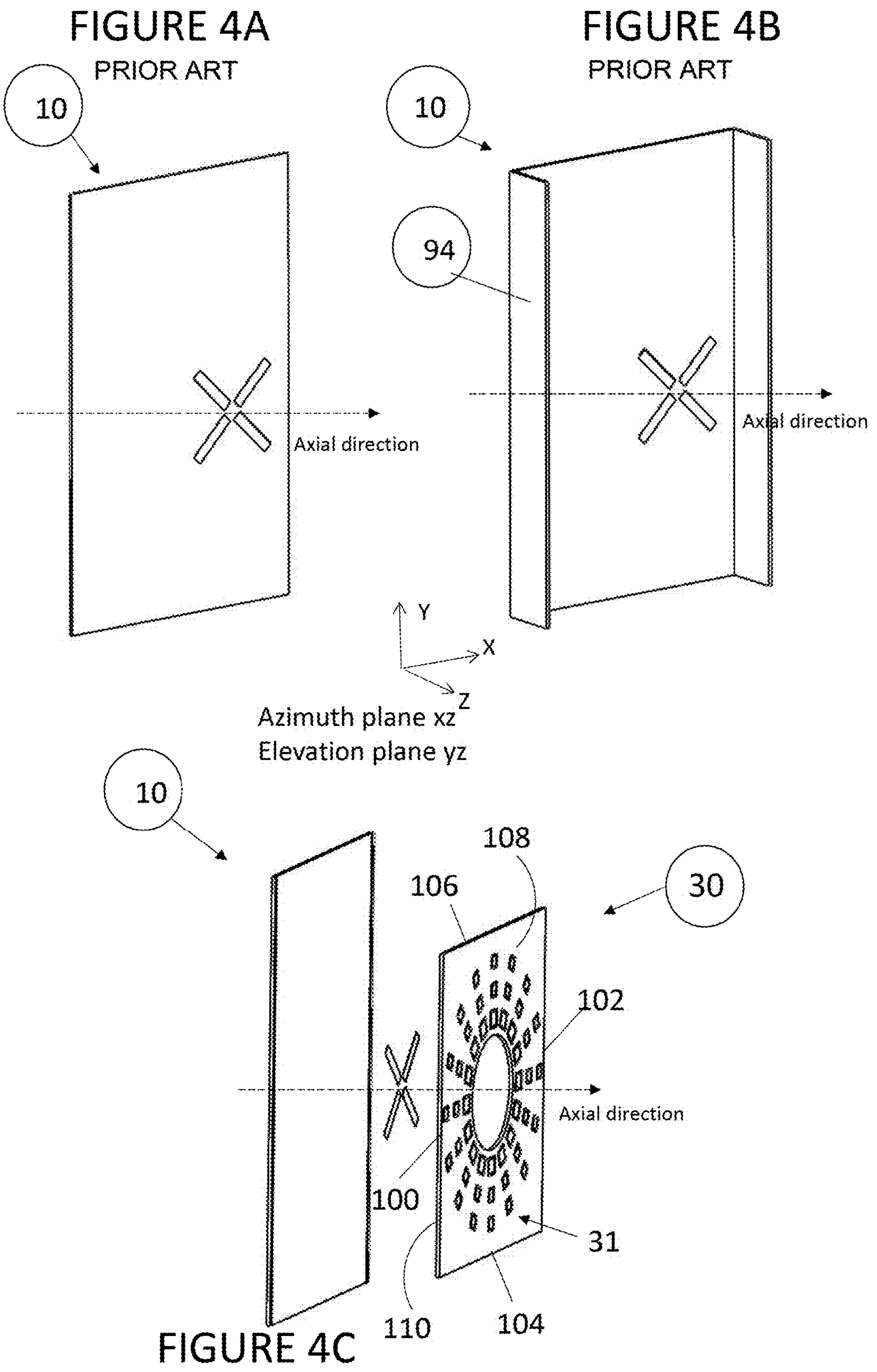
FIGURE 4A PRIOR ART
FIGURE 4B PRIOR ART
FIG. 4A shows a crossed dipole radiating element situated in front of a planar conductive reflector together with a set of reference Cartesian axes defining azimuth and elevation planes.
FIG. 4B shows a crossed dipole radiating element situated in front of a conductive reflector having a central planar region and provided with longitudinal flanges.
FIG. 4C shows a metasurface lens according to one or more non-limiting embodiments of the present disclosure, which is situated in front of the arrangement shown in FIG. 4A.

FIG. 4A shows a unidirectional antenna 10 according to prior art, as shown in FIG. 2, together with Cartesian axes defining azimuth and elevation planes which will be referred to in the following description.

FIG. 4B shows a unidirectional antenna 10 having a conductive reflector provided with lateral flanges 94, according to prior art, whose function is to reduce the beamwidth of the antenna. FIG. 4C shows an example of a substantially planar metasurface lens 30 according to one or more non-limiting embodiments of the present disclosure. The metasurface lens 30 is configured with a unidirectional antenna 10. The lens 30 extends along a first axis (e.g., an X-axis) from a first end 100 to an opposing second end 102 to define a horizontal length, extends along a second axis (e.g., a Y-axis) from a third end 104 to an opposing fourth end 106 to define a vertical height, and extends along a third axis (e.g., a Z-axis) from a first surface 108 to an opposing second surface 110 to define a thickness. In one or more non-limiting embodiments, the thickness of the lamina extends in a direction that is parallel to a center axis extending through the lamina and the axial direction in which the electromagnetic waves are radiated.

As described herein, the lamina includes an axial region 50 aligned with respect to the axial direction of the radiating structure such that energy radiated along the radiating path by antenna 10 passes through the lens 30, causing modification of the characteristics of the antenna 10. In such a configuration the lens is sometimes referred to as forming a 'superstrate' relative to the antenna.

Figure 5:
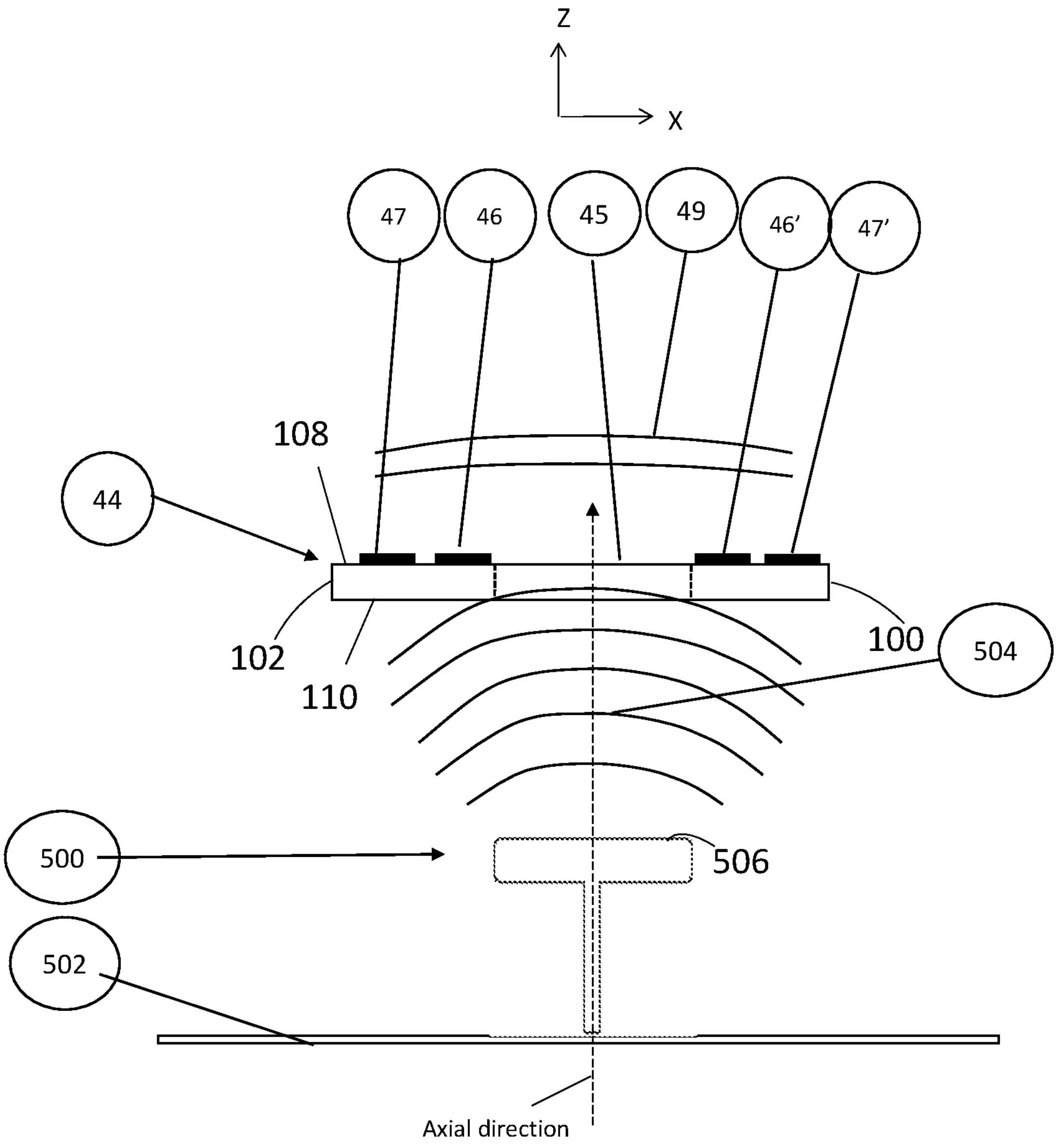
FIG. 5 shows a representation of wave fronts as they propagate from a source through a metamaterial lens according to one or more non-limiting embodiments of the present disclosure.

FIG. 5 shows a radiating element 500 (e.g., a source antenna 500) situated above a conductive reflector 502 and a succession of curved wave fronts 504 propagating away from a radiating surface 506 of the radiating element 500. According to a non-limiting embodiment, the radiating element 500 (e.g., a source antenna 500) can operate at a frequency greater than or equal to 0.5 gigahertz (Ghz) and less than or equal to 100 GHz.

Metasurface lens 44, configured according to one or more non-limiting embodiments of the present disclosure, includes a central aperture 45 surrounded by a plurality of conductive scattering elements 46, 46', 47, 47' arranged to provide a phase advance of the wavefront as it passes through the lens. According to a non-limiting embodiment, the central aperture 45 has a size that matches, or substantially matches, the size of the radiating surface 506. In other non-limiting embodiments, the aperture 45 is sized larger or smaller than the radiating surface 506. The outer regions 47, 47' of lens 44 are configured to provide a larger degree of phase advance than the inner regions 46, 46'. By this means the wavefront 49 emerging after passing through the lens 44 is reduced in curvature, or in other words "flattened.". This has the effect of reducing the beamwidth of the resultant radiation pattern, thereby increasing the directivity and gain of the source antenna. It will be understood that the number of rows or circles of scatterers is not limited to two as shown in FIG. 5, but may be any chosen number.

Figure 6A:
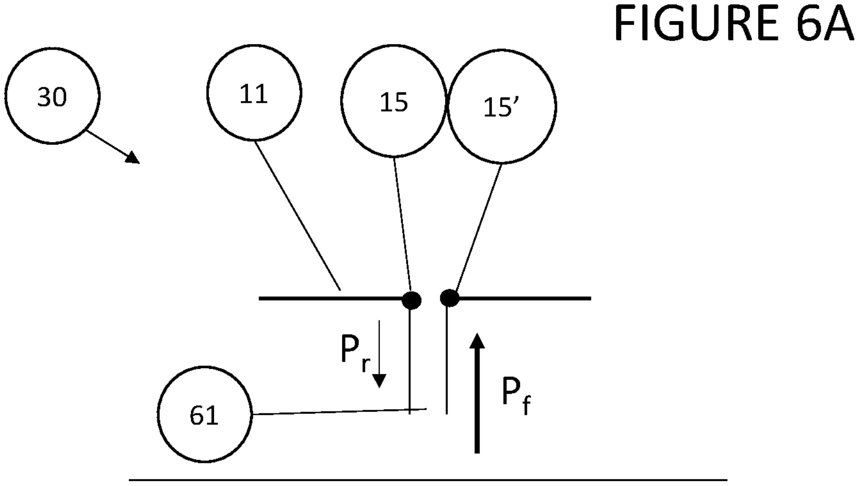
FIG. 6A shows a representation of the reflected power of a dipole radiating into free space.
Figure 6B:
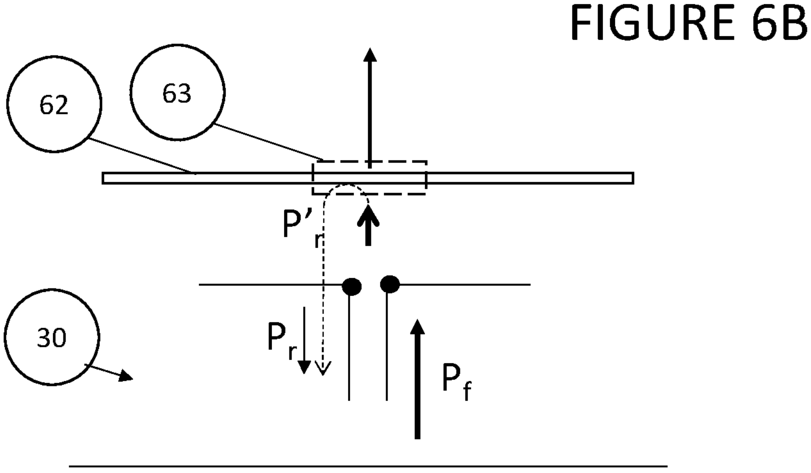
FIG. 6B shows a representation of the reflected power of the dipole caused by a proximate metasurface lens.

FIGS. 6A and 6B illustrate at least one advantage provided by one or more non-limiting embodiments of the present disclosure, wherein an antenna including a dipole 11 having terminals 15, 15' is supplied with a radio frequency signal with power (Pf) by means of a radio frequency transmission line, here represented as a balanced line 61. While most of the input power (Pf) is typically radiated by the dipole 11, some part of the input power (Pr) is reflected by reason of an imperfect impedance match between the dipole and the feedline 61 with which it is excited. While the addition of a superstrate lens 62 in FIG. 6B may create the intended effect on the radiation pattern of the antenna 30, the axial region 63 of the lens reflects some part (P'r) of the signal incident upon it. This reflected signal adds to the reflection caused by the dipole element. The relative phase of the reflections from the lens and the dipole is dependent of the phase of each reflected signal and the physical distance between the dipole and the lens. The consequent variation in the total reflected signal in both phase and amplitude creates a frequency-dependent variation in the input impedance of the dipole which is difficult to compensate and is likely to result in degraded performance of an array of dipole elements such as is used in a base station antenna. By providing an aperture or an area providing a low degree of scattering in the axial region of the lens, the power reflected from the lens is reduced, resulting in only a very small and potentially negligible change in the input impedance of the illuminating antenna. Accordingly, a lens according to one or more non-limiting embodiment of the present disclosure may be added to a pre-existing illuminating antenna without requiring re-optimization of the input impedance of the antenna.

FIGS. 7A, 7B, 7C and 7D show non-limiting examples of forms of conductive scattering elements configured as closed squares and concentric arrangements of closed squares.

In FIG. 7A the dielectric lamina 51, which receives electromagnetic waves traveling along a radiation path in an axial direction, and is void of conductive scatterers. In FIG. 7B a planar dielectric lamina 51 supports a plurality of electrically conductive elements to form a planar conductive scatterer in the form of a closed square 52. In FIG. 7C a planar dielectric lamina 53 supports a plurality of electrically conductive elements to form a planar conductive scatterer in the form of two concentric closed squares 54, 55. In FIG. 7D the lens 56 includes two planar dielectric lamina 57, 57' each supporting a plurality of electrically conductive elements to form planar conductive scatterers in the form of a closed square 58, 58' respectively. It will be understood that other shapes of scatterer would provide similar functionality, for example circles or polygons.

FIG. 7E is a graph showing measured transmission phase shifts through a single cell in each of the formats shown in FIGS. 7A-7D as a function of frequency. In each case the slope of the curves is caused by the separation between the ports between which the phase shift was computed. A lens which is large in diameter in terms of the operating wavelength may require larger phase shifts than can be provided by a single planar arrangement of conductive scattering elements, and it will be seen from FIGS. 3A-3B that these may be provided by a lens having conductive scatterers configured in a plurality of planes. In some applications, for example if a lens is required to have a small focal length or large physical dimensions in terms of the operating wavelength, the phase shift required through some regions of the lens may exceed that which can be provided by an arrangement of conductive scattering elements in a single plane. Larger phase shifts can be provided by arranging conductive scattering elements in a plurality of substantially parallel planes separated by a distance that is short in terms of the operating wavelength. If a phase shift greater than 360 degrees is required, then the known method of zoning may be applied as described hereinbefore.

In the example of FIG. 7D the scatterers are arranged in parallel planes and the scatterers on each plane are aligned in the axial direction, but other arrangements are possible.

FIGS. 8A, 8B, 8C and 8D show the results of computer simulations of a crossed dipole source antenna as shown in FIG. 4B, and comparative simulations made when a metasurface lens according to one or more non-limiting embodiment of the present disclosure is placed in front of the crossed dipole antenna as shown in FIG. 4C. In this example the lens was positioned at such a distance from the dipole as was found to provide the required azimuth beamwidth across the operating frequency range 3.4 GHz-4.2 GHz. In this example it can be seen that while the azimuth beamwidth shown in FIG. 8A is substantially unaffected by the addition of the lens, the elevation beamwidth shown in FIG. 8B is substantially reduced, especially at the upper frequencies of the range of operation. The gain of the antenna is increased as shown in FIG. 8C, especially at the upper end of the frequency range of operation.

FIGS. 9A, 9B, 9C and 9D show the results of simulations of a crossed dipole source antenna as shown in FIG. 4A, together with comparative measurements made when a metasurface lens according to one or more non-limiting embodiments of the present disclosure is placed in front of the crossed dipole antenna. In this example the lens was positioned at such a distance from the dipole as was found to provide maximum gain across the operating frequency range 3.4-4.2 GHz. It can be seen that the azimuth beamwidth in FIG. 9A and elevation beamwidth in FIG. 9B are substantially reduced by the addition of the lens, while the gain, shown in FIG. 9C is substantially increased, especially at the upper end of the frequency range of operation. The table in FIG. 9D shows the increase in gain at selected frequencies within the range of operation.

Figure 10A:
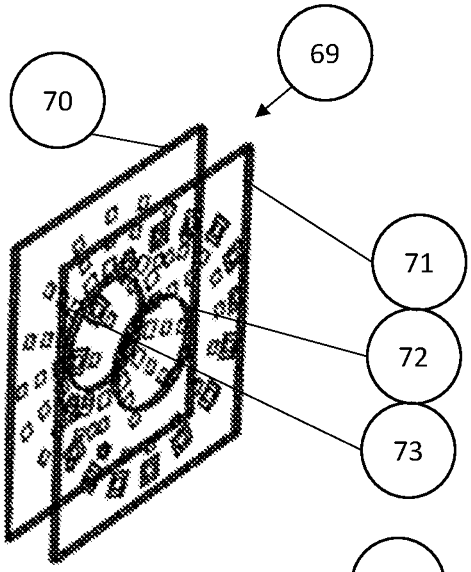
FIG. 10A is a perspective view of a lens including a plurality of planar dielectric members having apertures in their respective axial regions according to one or more non-limiting embodiments of the present disclosure.
Figure 10B:
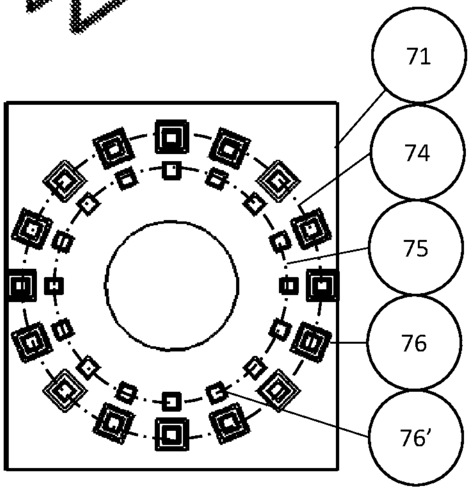
FIG. 10B is an example of an arrangement of conductive scattering elements forming two concentric circles around an axial aperture according to one or more non-limiting embodiments of the present disclosure.
Figure 10C:
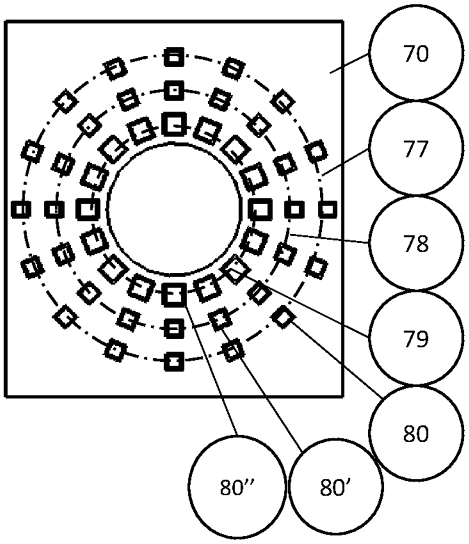
FIG. 10C is an example of an arrangement of conductive scattering elements forming three concentric circles around an axial aperture according to one or more non-limiting embodiments of the present disclosure.

FIG. 10A is a perspective view of a lens 69 according to one or more non-limiting embodiments of the present disclosure. The lens 69 includes a plurality of planar dielectric members 70, 71, having apertures 72, 73 in their respective axial regions. FIG. 10B shows planar dielectric member 71, which in this example supports planar conductive scattering members arranged in two concentric circles 74, 75 each including sixteen (16) uniformly distributed conductive scatterers 76, 76'. FIG. 10C shows planar dielectric member 70, which in this example supports conductive scattering members arranged in three concentric circles 77, 78, 79 each including sixteen (16) planar conductive scatterers 80, 80', 80" uniformly distributed around the circumference of circles 77, 78, 79. It will be appreciated that the arrangement, number and geometrical shape of the conductive scatterers on each lamina of a lens including a plurality of lamina may be independently selected and the dimensions of each parameter optimized concurrently by use of an electronic computer program such as those mentioned hereinabove.

FIGS. 11A, 11B, 11C and 11D show the results of simulations of a crossed dipole source antenna as shown in FIG. 4A, and comparative simulated results when a two-layer metasurface lens 69 according to the present disclosure is placed in front of the crossed dipole antenna. In this example the lens was positioned to provide maximum gain across the operating frequency range 3.4-4.2 GHz, this was found to be 0.65 wavelengths from the reflector and 0.4 wavelengths from the dipole, these dimensions being at 4.0 GHz. The azimuth beamwidth shown in FIG. 11A and the elevation beamwidth shown in FIG. 11B are both substantially reduced, thereby increasing the gain of the antenna as shown in FIG. 11C. The table in FIG. 11D shows the increase in gain at selected frequencies within the frequency range of operation.

Figure 12:
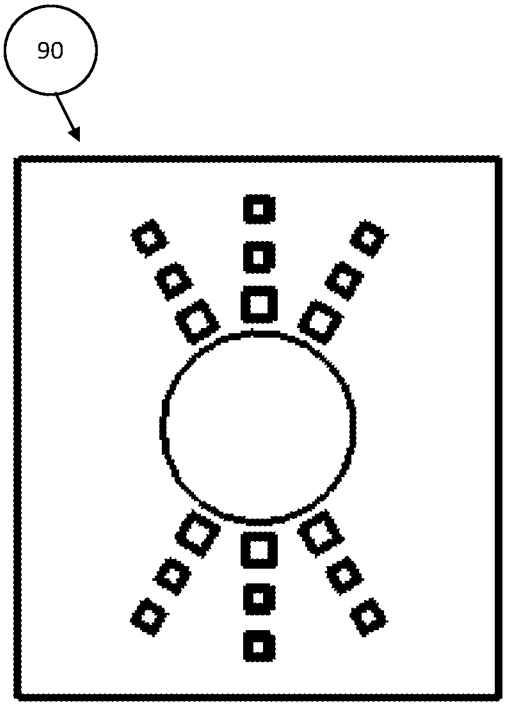
FIG. 12 shows an asymmetric metasurface lens configured to provide a differential focusing action in the azimuth and elevation planes according to one or more non-limiting embodiments of the present disclosure.

FIG. 12 shows a further embodiment of a lens according to one or more non-limiting embodiments of the present disclosure. The lens is configured to provide a focusing action in one plane, for example the elevation plane, while having a reduced focusing action in an orthogonal plane, for example the azimuth plane, wherein only those radii of the lens are populated with conductive scatterers which are substantially parallel with the plane in which focusing is required.

Figure 13:
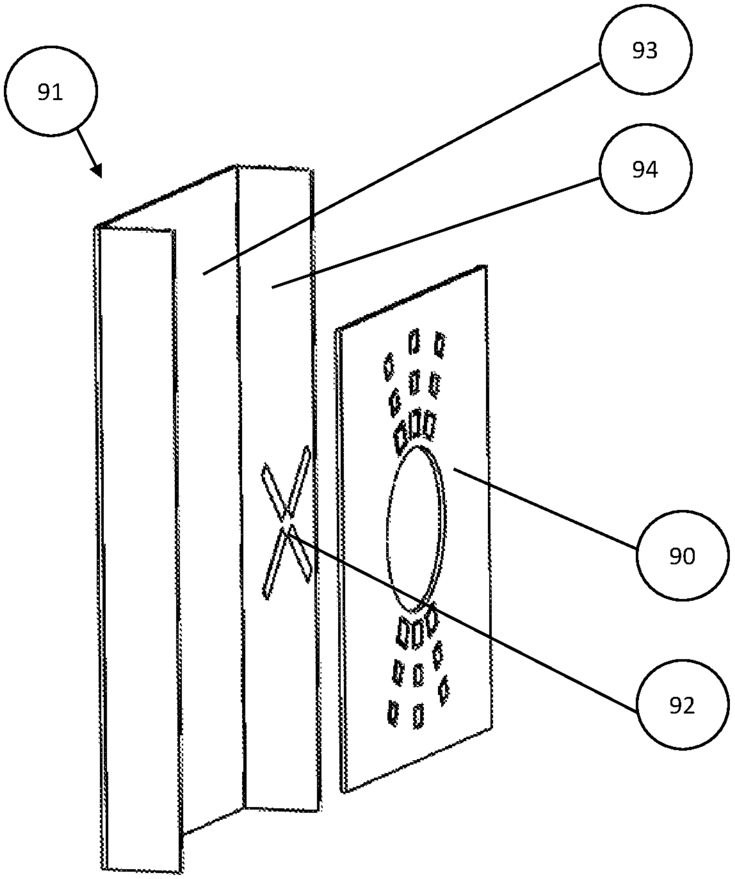
FIG. 13 shows an asymmetric metasurface lens arranged in front of a source antenna including a crossed dipole element and a conductive reflector provided with lateral flanges according to one or more non-limiting embodiments of the present disclosure.

FIG. 13 shows an axially asymmetric lens 90 according to one or more non-limiting embodiments of the present disclosure, which is arranged in front of a source antenna including a crossed dipole element 92 and a conductive reflector 93 provided with lateral flanges 94. In this exemplary embodiment the objective of the lens was to increase the gain of the source of the antenna while not changing its azimuth beamwidth. This was achieved by reducing only the elevation beamwidth of the source by the application of the asymmetric lens according to the non-limiting embodiment shown in FIG. 12.

FIGS. 14A, 14B, 14C and 14D show the simulated performance of the antenna of FIG. 13 with and without the use of the lens 90. It can be seen that the azimuth beamwidth shown in FIG. 14A is substantially unaffected by the addition of the lens, while the elevation beamwidth shown in FIG. 14B is reduced and the gain in FIG. 14C is increased, especially at the upper end of the frequency range of operation. The table in FIG. 14D shows the increase in gain at selected frequencies within the frequency range of operation.

Figure 15:
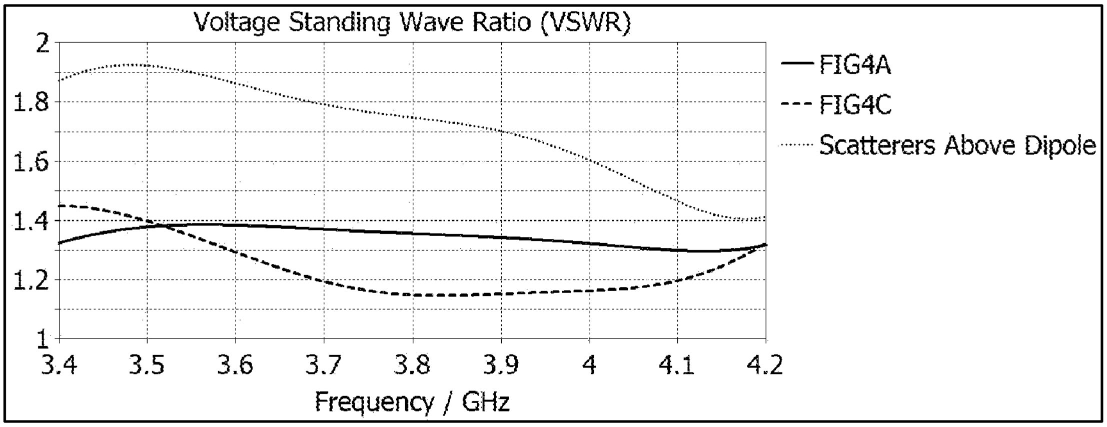
FIG. 15 is a graph of VSWR as a function of frequency, showing the simulated VSWR of the antennas of FIGS. 4A and 4C, together with and the case where the lens has no central aperture, as is provided by one or more non-limiting embodiments of the present disclosure, and conductive scatterers are positioned above the physical aperture of the dipole.

FIG. 15 shows the measured VSWR of a crossed dipole antenna configured approximately a quarter-wavelength in front of a planar conductive reflector, together with the measured VSWR when a lens according to one or more non-limiting embodiments of the present disclosure is placed in front of the crossed dipole. It will be appreciated that the maximum VSWR across the frequency range 3.4-4.2 GHz remains below 1.5:1 for the lens according to one or more non-limiting embodiments of the present disclosure. By contrast, as shown the measured VSWR rose to 1.9:1 when a lens, including scatterers over the physical aperture of the dipole, was placed in the same position.

A lens according to one or more non-limiting embodiments of the present disclosure can be manufactured from low-loss copper-clad dielectric laminas using low-cost printed-circuit techniques. In one or more non-limiting embodiments, the conductive scatterers may be formed on or supported by two faces of a thick dielectric sheet, for example a sheet of rigid polystyrene foam.

While a lens according to one or more non-limiting embodiments of the present disclosure may be fabricated on at least one substantially planar substrate, other non-limiting embodiments allow for forming the lens on at least one curved substrate or on a combination of planar and curved substrates.

A lens according to one or more non-limiting embodiments of the present disclosure may conveniently be supported in position by means of a plurality of elongate dielectric members extending from the antenna. In one or more non-limiting embodiments, a lens may be supported by, or be integral with, a protective dielectric cover enclosing the antenna, often referred to as a radome.

The teachings described herein may be implemented as an apparatus and/or a method at any possible technical detail level of integration. Aspects of the disclosure may be described herein with reference to flowchart illustrations and/or block diagrams of one or more methods. In some alternative implementations, the functions noted in the blocks may occur out of the order noted in the Figures or the block diagrams may be oriented in other orientations. For example, two blocks shown in succession may, in fact, be performed substantially concurrently, or the blocks may sometimes be arranged in the reverse order.

The descriptions of the various embodiments have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The invention claimed is:

1. An antenna comprising:
- at least one radiating structure configured to radiate electromagnetic waves along a radiating path extending in an axial direction; and
- a lens disposed in the radiating path and configured to pass the electromagnetic waves therethrough, the lens including:
  - at least one lamina having a first surface, a second surface, a center axis that is aligned with the axial direction, a lamina thickness between the first surface and the second surface in a direction parallel to the axial direction, and an axial region extending about the center axis; and
  - a plurality of conductive scattering elements arranged on the first surface, the second surface or both the first surface and the second surface,
  - wherein an aperture extends through the axial region of the lens, the aperture comprising an area without any conductive scattering elements where the material of the at least one lamina is omitted, and
- wherein the at least one radiating structure is exposed through the aperture.

2. The antenna according to claim 1, wherein an amount of back-scattered energy reflected by the axial region is less than an amount of back-scattered energy reflected by a non-axial region of the at least one lamina comprising the plurality of conductive scattering elements.

3. The antenna according to claim 1, wherein the plurality of conductive scattering elements include at least one of planar conductive scattering elements shaped as unfilled polygons, planar conductive scattering elements shaped as filed polygons, planar conductive scattering elements shaped as circular closed lines, and planar conductive scattering elements shaped as filled circles.

4. The antenna according to claim 1 wherein the plurality of conductive scattering elements have a profile of one or a combination of concentric circles, ellipses, and polygons.

5. The antenna according to claim 1 wherein the plurality of conductive scattering elements are arranged in rows extending in a radial direction with respect to the axial direction.

6. The antenna according to claim 1, wherein the plurality of conductive scattering elements are disposed in a rectilinear arrangement that forms a plurality of rows and a plurality of columns.

7. The antenna according to claim 1, wherein the at least one lamina includes at least one of a planar lamina or a curved lamina.

8. The antenna according to claim 1, wherein the at least one lamina includes a plurality of laminas arranged in series next to one another along the axial direction, the plurality of laminas including:
- a first lamina including a first plurality of conductive scattering elements having a first arrangement, a first shape, and a first size; and
- a second lamina including a first plurality of conductive scattering elements having a second arrangement, a second shape, and a second size,
- wherein at least one of the second arrangement, the second shape, and the second size is different from the first arrangement, the first shape, and the first size, respectively.

9. The antenna according to claim 1, wherein the at least one radiating structure operates at a frequency greater than or equal to 0.5 Gigahertz and less than or equal to 100 GHz.

10. The antenna according to claim 1, wherein a size of the aperture substantially matches a size of a radiating surface of the at least one radiating structure.

11. The antenna according to claim 1, wherein at least one lamina comprises a plurality of laminas arranged in series next to one another along the axial direction, wherein the lamina in the plurality of lamina have major surfaces that extend in parallel planes, where a first conductive scattering element that is on a first of the plurality of lamina overlaps a second conductive scattering element that is on a second of the plurality of lamina in the axial direction.

12. The antenna according to claim 1, wherein the conductive scattering elements on the first surface extend radially from a central point and are arranged in a plurality of concentric circular rings.

13. The antenna according to claim 12, wherein the plurality of concentric circular rings comprise at least three circular rings of conductive scattering elements.

14. The antenna of claim 13, wherein respective sizes of the conductive scattering elements within each circular ring are the same, while sizes of the conductive scattering elements in different circular rings are different.

15. A metasurface lens comprising:

at least one lamina configured to pass electromagnetic waves traveling along a radiating path that extends along an axial direction of at least one radiating structure, the at least one lamina including:

a first surface spaced apart from a second surface in a direction parallel to the axial direction to define a lamina thickness;

an axial region extending radially from a center axis of the at least one lamina and configured to align with the radiating structure along the axial direction; and a plurality of conductive scattering elements arranged on one or both of the first surface and the second surface, wherein an aperture extends through the axial region of the lens, the aperture comprising an area without any conductive scattering elements where the material of the at least one lamina is omitted, and wherein the radiating structure is exposed through the aperture.

16. A method of manufacturing an antenna comprising:

positioning a lens of the antenna in a radiating path that extends in an axial direction, wherein at least one radiating structure of the antenna is configured to radiate electromagnetic waves along the radiating path, and wherein the lens is configured to pass the electromagnetic waves therethrough, the lens including:

at least one lamina having a first surface, a second surface, a center axis that is aligned with the axial direction, a lamina thickness between the first surface and the second surface in a direction parallel to the axial direction, and an axial region extending about the center axis; and a plurality of conductive scattering elements arranged on the first surface, the second surface or both the first surface and the second surface, wherein an aperture extends through the axial region, the aperture comprising an area without any conductive scattering elements where the material of the at least one lamina is omitted, and wherein the at least one radiating structure is exposed through the aperture.

* * * * *